(12) United States Patent
Mori et al.

(10) Patent No.: US 7,500,605 B2
(45) Date of Patent: Mar. 10, 2009

(54) TAMPER RESISTANT DEVICE AND FILE GENERATION METHOD

(75) Inventors: Kensaku Mori, Yokohama (JP); Masayuki Terada, Yokosuka (JP); Kazuhiko Ishii, Yokohama (JP); Sadayuki Hongo, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 60 days.

(21) Appl. No.: 11/377,257

(22) Filed: Mar. 17, 2006

(65) Prior Publication Data

US 2006/0214006 A1 Sep. 28, 2006

(30) Foreign Application Priority Data

Mar. 18, 2005 (JP) ............................ P2005-080454

(51) Int. Cl.
*G06K 5/00* (2006.01)
(52) U.S. Cl. ...................................................... 235/380
(58) Field of Classification Search .................. 235/380
See application file for complete search history.

(56) References Cited

U.S. PATENT DOCUMENTS

| | | | | |
|---|---|---|---|---|
| 5,515,532 | A | * | 5/1996 | Iijima .......................... 707/200 |
| 5,724,520 | A | | 3/1998 | Goheen |
| 6,012,143 | A | * | 1/2000 | Tanaka ......................... 726/20 |
| 2001/0018660 | A1 | * | 8/2001 | Sehr ............................... 705/5 |
| 2002/0125328 | A1 | * | 9/2002 | Sukeda et al. ................ 235/492 |

FOREIGN PATENT DOCUMENTS

| | | |
|---|---|---|
| JP | 2000-36015 | 2/2000 |
| JP | 2001-36570 | 2/2001 |
| JP | 2002-298052 | 10/2002 |
| JP | 2003-223235 | 8/2003 |
| JP | 2003-337887 | 11/2003 |
| JP | 2004-62870 | 2/2004 |
| JP | 2004-265026 | 9/2004 |
| JP | 2005-11239 | 1/2005 |
| KR | 2001-0075265 | 8/2001 |
| WO | WO 98/33343 | 7/1998 |
| WO | WO 01/07989 A1 | 2/2001 |

OTHER PUBLICATIONS

Masayuki Terada, et al., "Copy Prevention Scheme for Rights Trading Infrastructure", 4th Smart Card Research and Advanced Application Conference-CARID2000. pp. 1-20.

* cited by examiner

*Primary Examiner*—Karl D Frech
*Assistant Examiner*—Tae W Kim
(74) *Attorney, Agent, or Firm*—Oblon, Spivak, McClelland, Maier & Neustadt, P.C.

(57) ABSTRACT

It is an object to provide a tamper resistant device and a file generation method which can store right value information such as a ticket information, and guarantee validity of the right value information without executing a digital signature processing.

An IC card 102 attached to a portable terminal 100 receives, from an application 101, right value information representing a right value and a file generation message instructing generation of a rights-file. The right value information includes file data representing the right value, data size and the like. Upon determining that a file generation message is received, the IC card 102 generates a rights-file including the IC card identification ID and right value information which are previously stored in the IC card 102.

6 Claims, 7 Drawing Sheets

| FILE GENERATION MESSAGE | |
|---|---|
| SOURCE OF TRANSMISSION | ap_id |
| DESTINATION OF TRANSMISSION | icc_id |
| NUMERICAL INFORMATION | mtype |
| DATA SIZE | LEN |
| RIGHT VALUE INFORMATION | data |

*Fig.4*

| | |
|---|---|
| RIGHT VALUE INFORMATION | data |
| STORAGE DESTINATION FOLDER | folder |
| RIGHT VALUE DATA | fileDATA |
| DATA SIZE OF RIGHT VALUE | fileLEN |
| ACCESS RIGHT | fileACL |
| NUMBER OF RIGHT VALUES | fileCnt |

TAMPER RESISTANT DEVICE AND FILE GENERATION METHOD

BACKGROUND OF THE INVENTION

1. Field of the Invention

The present invention relates to a tamper resistant device and a file generation method thereof generating right value information such as ticket information.

2. Related Background of the Invention

Conventional IC cards receive a WriteRecord command being a file generation message from an external application, and it is possible to generate a data part as one file upon writing the value of the data part of the WriteRecord command into a record region of a WEF (working elementary file). When the data part is taken to as right value information representing a right value, an IC card is capable of storing the file with right value information. For example, an owner possessing the IC card into which ticket information such as an event ticket is previously stored therein as right value information, can use a card-reader at the entrance of an event site to read the right value information in the IC card. Thus, the IC card can function as a ticket.

Here, since anyone can generate right value information having the value of a ticket if the person knows only the data content such as the data structure of the right value information, it is necessary for the IC card to bear accompanying a signature for the right value information. For example, Japanese Patent Application Laid-Open No. 2005-11239 describes a ticket transfer system which can apply a digital signature to right value information such as a ticket or a terminal ID, and store it into a portable terminal.

SUMMARY OF THE INVENTION

However, when a card-reader disposed at the entrance of an event site tries to verify digitally signed right value information, it is necessary to decode the digitally signed right value information. Decoding process requires a certain time period. Thus, a problem arises, when considering the verification time including the decoding process, in that it will not be possible to use an IC card storing right value information bearing a digital signature as a ticket at the entrance of an event site where congestion is anticipated. In addition, when right value information is desired to be distributed, in a method using the above-mentioned digital signature, the digital signature can be eliminated from the right value information and right value information with a newly provided digital signature can be distributed that is not substantially meaningful as a signature.

Therefore, it is an object of the present invention to provide a tamper resistant device and a file generation method which can store right value information such as ticket information, and guarantee the validity of the right value information without executing a digital signature process.

In order to solve the above-mentioned problems, the tamper resistant device according to the present invention which stores an identifier capable of uniquely identifying the tamper resistant device comprises: a receiving means for receiving a file generation message including right value information representing a right value and instruction information which instructs generation of a rights-file including the right value information and the above-mentioned identifier; a message determination means for determining whether or not the file generation message received by the receiving means includes right value information representing a right value and instruction information which instructs generation of a rights-file including the right value information and the above-mentioned identifier; a file generation means for generating, if the above-mentioned message determination means determines that the file generation message received by the receiving means includes the above-mentioned right value information and the above-mentioned instruction information, a rights-file including the above-mentioned identifier and the right value information; and a storage means for storing the rights-file generated by the above-mentioned file generation means. Here, the tamper resistant device is a storage device having tamper resistant characteristics, i.e., a storage device with a capability of blocking access from anyone not permitted (unauthorized access). For example, tamper resistant devices include an IC memory, an IC card or the like.

Further, a file generation method according to the present invention of a tamper resistant device which stores an identifier capable of uniquely identifying the tamper resistant device comprises: a receiving step for receiving a file generation message including right value information representing a right value and instruction information which instructs generation of a rights-file including the right value information and the above-mentioned identifier; a message determination step for determining whether or not the file generation message received by the receiving step includes right value information representing a right value and instruction information which instructs generation of a rights-file including the right value information and the above-mentioned identifier; a file generation step for generating, if the above-mentioned message determination step determines that the file generation message received by the receiving step includes the above-mentioned right value information and the above-mentioned instruction information, a rights-file including the above-mentioned identifier and the right value information; and a storing step for storing the rights-file generated by the above-mentioned file generation step.

According to the invention, it becomes possible to receive a file generation message including right value information representing a right value and instruction information instructing generation of rights-file; to determine whether or not the received file generation message includes right value information representing a right value and instruction information instructing generation of a rights-file; and, if it is determined that the received message includes the right value information and the instruction information, to generate and store a rights-file including the identifier and the right value information. This enables generation of a rights-file including the identifier and the right value information, and it is possible to guarantee, using the identifier included in the rights-file, the generator and validity of the right value information, without executing a signature process for the right value information.

For example, when the tamper resistant device outputs the rights-file including the right value information and the identifier to another portable terminal having an IC card, verification of the right value information at the other portable terminal which received the generated rights-file is realized using an external card-reader. Then, the external card-reader can verify the validity of the right value information by only executing a simple process such as verifying the collation between the right value information and the identifier, and also performs the process much faster than the case executing the signature process.

The present invention can generate a rights-file including an identifier and right value information, and guarantees, using the identifier included in the rights-file, the generator and validity of the right value information, without executing a signature process for the right value information.

DESCRIPTION OF THE PREFERRED EMBODIMENTS

The present invention can be easily understood by considering the following detailed description, with reference to the accompanying drawings shown for an embodiment thereof. Subsequently, an embodiment of the present invention will be described with reference to the accompanying drawings. Whenever possible, like elements are provided with like numerals, with duplicated description having been omitted.

Figure 1:
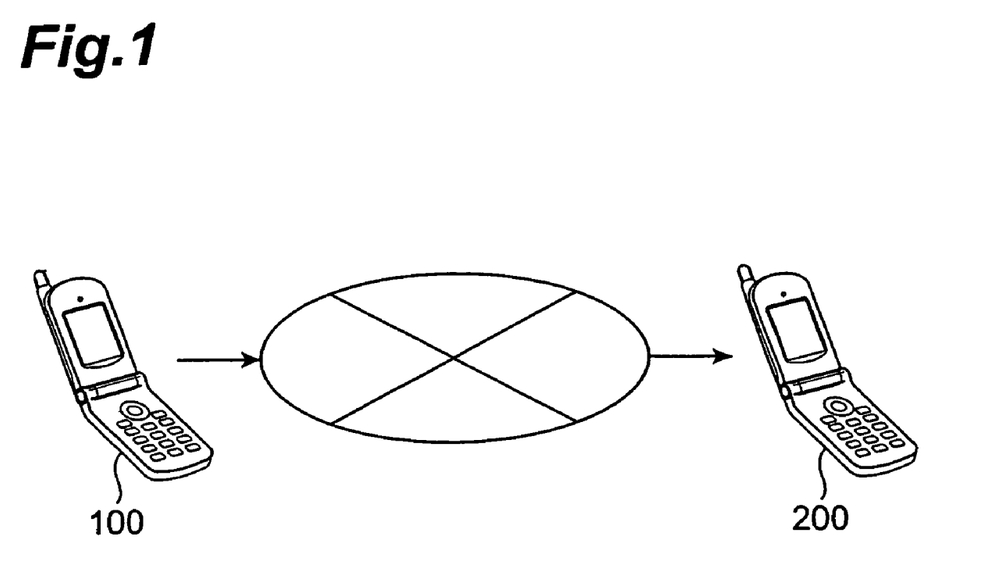
FIG. 1 is a system configuration diagram composed of a portable terminal 100 and a portable terminal 200 according to the present embodiment.

First, the outline of the embodiment of the present invention will be described referring to FIG. 1. FIG. 1 is a system configuration diagram composed of a portable terminal 100 and a portable terminal 200 in the present embodiment. The portable terminal 100 is a portable terminal for generating right value information which is ticket information such as an event ticket. The portable terminal 100 can transmit right value information (e.g., ticket information) to the portable terminal 200, enabling a user of the portable terminal 200 which received the right value information to use the right value information.

For example, the portable terminal 100 is a portable terminal possessed by a ticket seller such as an event promoter, and the portable terminal 100 with an attachable IC card which is a tamper resistant device. Here, a tamper resistant device is a storage device having tamper resistant characteristics, with a capability of blocking access from anyone not permitted (unauthorized access). For example, tamper resistant devices include an IC memory, an IC card or the like. In addition, the portable terminal 100 generates a rights-file adding the right value. information to an inherent IC card identification ID (identifier) for the IC card, when generating right value information being electronic ticket information, by operation of the ticket seller. The IC card identification ID to be specific for the IC card is identification information which can uniquely identify an IC card on the network.

On the other hand, the portable terminal 200 provided with a non-contact IC card .can download, via a network, the right value information generated by the portable terminal 100. A user of the portable terminal 200 holds the portable terminal 200 having a non-contact IC card attached therein, over a non-contact card-reader disposed at the entrance of an event site so that the rights-file including the right value information and IC card identification ID stored in the portable terminal 200 is read by the non-contact card-reader. In addition, the IC card attached to the portable terminal 200 may be arranged so as to transmit the right value information by infrared ray communication or Bluetooth communication.

The non-contact card-reader can determine whether or not the right value information is valid, by previously storing the right value information and IC card identification ID related with each other, reading the right value information and IC card identification ID from the non-contact IC card of the portable terminal 200, and collating them with the right value information and the IC card identification ID previously stored therein. In the present embodiment, since the rights-file stored in the IC card of the portable terminal 100 is directly transferred to the IC card of the portable terminal 200 using a communication protocol for direct communication connecting the IC cards having tamper resistant characteristics, there is no possibility of tampering by a third party, whereby realizing the functionality as valid right value information whenever the IC card identification IDs are determined to match. In addition, since the identifier to be verified is not encrypted, the verification process can be quickly performed.

By such a system, right value information stored in the IC card can achieve the functionality as a ticket information, as well as the validity of the right value information is guaranteed, without using a signature technique. Hereinafter, there will be described in detail the tamper resistant device and file generation method which can generate a rights-file including the right value information and IC card identification ID.

Figure 2:
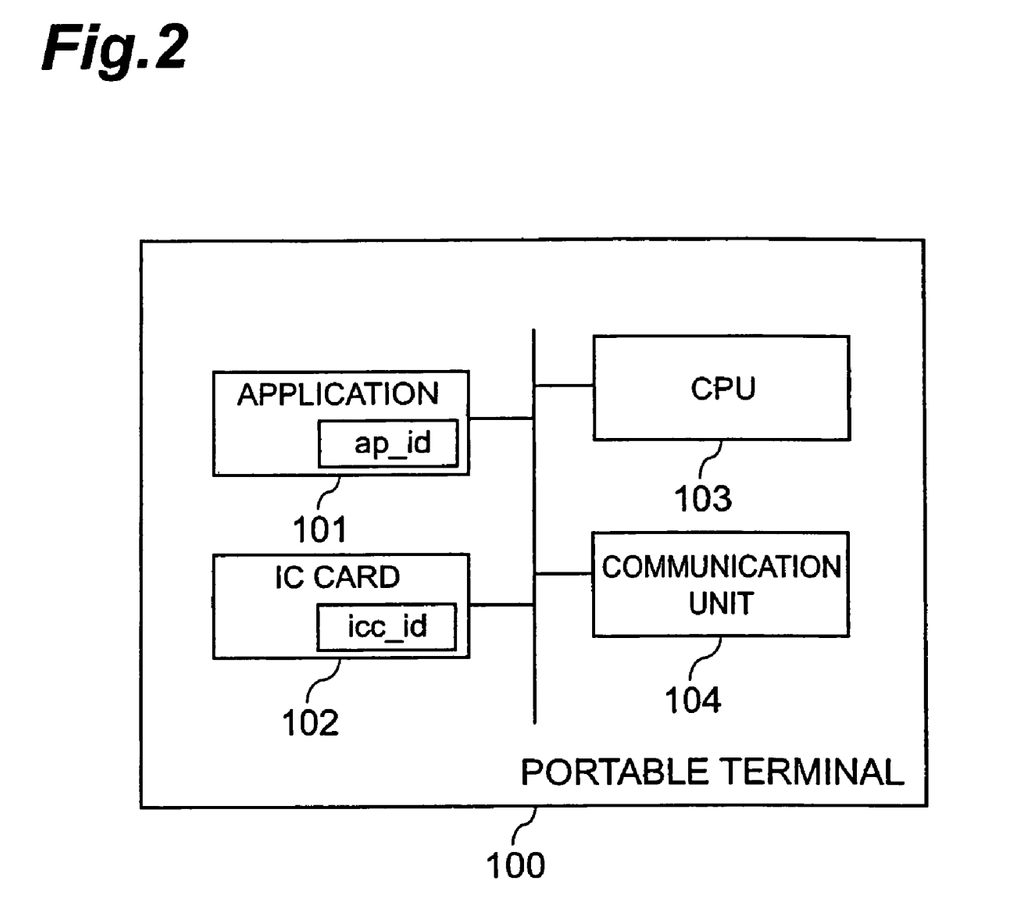
FIG. 2 is a block configuration diagram of the portable terminal 100 having an IC card 102 which is a tamper resistant device.

FIG. 2 is a block configuration diagram of the portable terminal 100 provided with an IC card 102 being a tamper resistant device. The portable terminal 100 is composed of an application 101, an IC card 102, a CPU 103, and a communication unit 104.

The application 101, being an application for generating right value information, executes a request for the generation process of a rights-file including right value information and IC card identification ID, by user operation of the portable terminal 100. Then, the application 101 generates a file generation message based on the user operation and outputs the file generation message to the IC card 102. In addition, the application 101 can receive a completion notification indicating that a rights-file including the right value information and IC card identification ID has been generated in the IC card 102.

Figure 3:
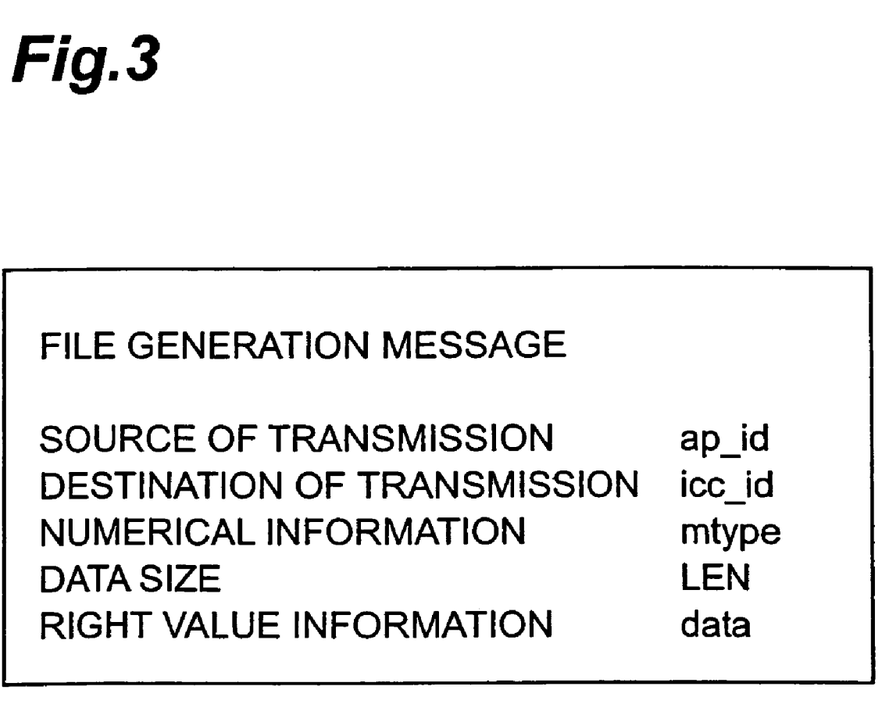
FIG. 3 is a conceptual diagram of a file generation message.

Here, there will be described a concrete example of a file generation message referring to FIG. 3. FIG. 3 is a conceptual diagram of a file generation message. The file generation message is composed of an application identification ID "ap_id" indicating the transmission source of the application 101; an IC card identification ID "icc_id" of the IC card 102 which is a transmission destination stored specifically for each IC card; a numeral information "mtype" indicating an instruction to generate a file; right value information "data" indicating data content of the right value; and "LEN" indicating the data size of the right value information "data". Additionally, the application identification ID "ap_id" is an identifier uniquely defined in the portable terminal 100, and the IC card identification ID "icc_id" is an identifier uniquely defined on the network.

Figure 4:
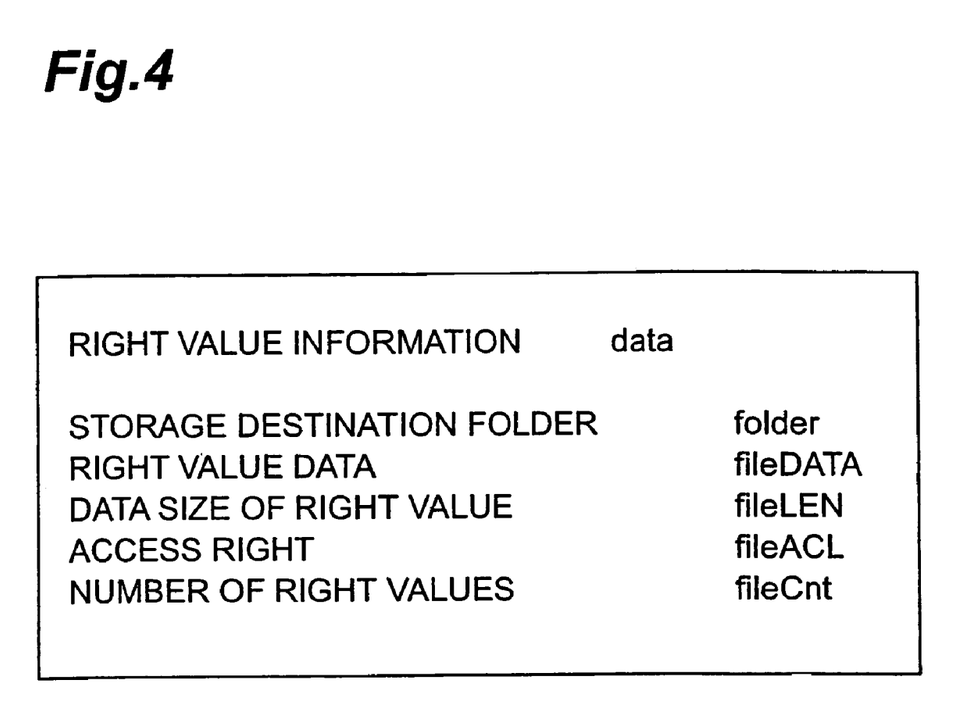
FIG. 4 is a conceptual diagram illustrating the outline of the right value information.

Now, the information included in the right value information will be described. FIG. 4 is a conceptual diagram illustrating the outline of the right value information. As shown in FIG. 4, the right value information includes a storage destination folder "folder" for storing the right value information, among a plurality of folders provided in the IC card 102; file data "fileDATA" indicating the data content of the right value: data size "fileLEN" indicating the size of the data content "fileDATA" of the right value; the access right "fileACL"; and the number of right values "fileCNT". Here, the information representing the access right is authorization information which permits copying of right value information, or authorization information which permits distribution of rights information, which authorization information may be capable of being set as the access right. In addition, the number of right values corresponds to, for example, the number of sheets of a ticket.

The explanation continues referring again to FIG. 2. The IC card 102 is a unit for storing the IC card identification ID "icc_id" uniquely defined on the network. Upon receiving a file generation message transmitted from the application 101, the IC card 102 generates a rights-file including the right value information included in the file generation message and an IC card identification ID "icc_id" stored in the IC card 102, and stores the generated rights-file.

Figure 5:
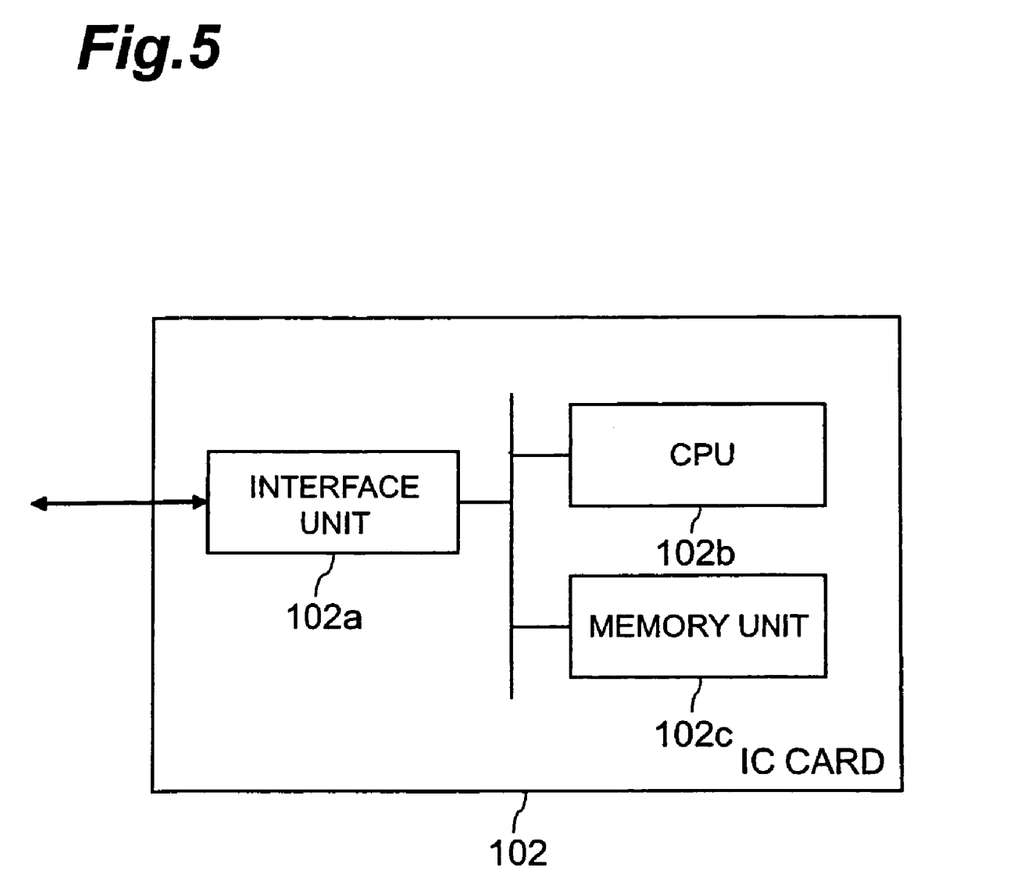
FIG. 5 is a block configuration diagram of the IC card 102.

Hereinafter, the constitution of the IC card 102 being a tamper resistant device will be described below referring to FIG. 5. FIG. 5 is a block configuration diagram of the IC card 102. As shown in FIG. 5, the IC card 102 constituted by including an interface unit 102a (receiving means), a CPU 102b (message determination means and file generation means), and a memory unit 102c (storage means).

The interface unit 102a is a unit for connecting the portable terminal 100 to enable data communication, and can receive file generation messages from the portable terminal 100.

The CPU 102b is a unit for controlling the IC card 102 and, in the present embodiment, upon determining that the file generation message includes the right value information "data" and the numeral information "mtype", the CPU 102b generates a rights-file including the right value information and IC card identification ID.

In addition, the CPU 102b determines, when storing the rights-file, whether or not the size of the rights-file to be stored is larger than the size of a single record area of the folder formed in the IC card 102, where the rights-file is calculated based on the size of parameters such as data size of the right value included in the right value information and other parameters such as access right and the number of right values, and the size of the IC card identification ID. If the size of the rights-file to be stored is smaller than the size of a single record area, the CPU 102b instructs the memory unit 102c to store the rights-file.

In addition, if the CPU 102b generated and stored the rights-file, the CPU 102b outputs a completion notification indicating that storage of the generated rights-file has been finished to the application 101 via the interface unit 102a.

Furthermore, if the CPU 102b determined that the size of the rights-file is larger than the size of a single record area, the CPU 102b determines whether or not failure occurred when generating the rights-file. Specifically, the CPU 102b determines whether or not the numerical value indicated by the data size "LEN" of the right value information differs from the real size of the right value information "data". In addition, the CPU 102b determines whether the application identification ID of the application 101 which is the source of the transmission is not stored in the IC card 102 as the owner and thus impossible to authenticate. In addition, the CPU 102b determines whether or not a folder indicated as the storage destination folder "folder" exists in the IC card 102. In addition, the CPU 102b determines whether or not the number of right values "fileCNT" is zero. In addition, the CPU 102b determines whether or not the numerical value indicated by the data size "fileLEN" of the right value exceeds a maximum storage file size. In addition, the CPU 102b determines whether or not free space exists for newly generating a file. In addition, the CPU 102b determines whether or not the number of right values "fileCNT" when generating a rights-file is larger than a specified value.

Upon determining that failure occurred when generating the rights-file, the CPU 102b outputs, to the application 101, an error message corresponding to the failure via the interface unit 102a. For example, if the numerical value indicated by the data size "LEN" of the right value information is different from the real size of the right value information "data", the CPU 102b outputs an illegal error message indicating so. In addition, the CPU 102b outputs an access violation error message to indicate that, when the CPU 102b does not store the application identification ID of the application 101 being the source of transmission as the owner, and thus cannot normally authenticate the application identification ID. In addition, if a folder indicated as the storage destination folder "folder" does not exist in the IC card 102, the CPU 102b outputs an error message indicating that the folder does not exist. In addition, if the number of right values "fileCNT" is zero, the CPU 102b outputs an illegal error message indicating so. In addition, if the numerical value indicated by the data size "fileLEN" of the right value exceeds the maximum storage file size and there is no free space for newly generating a file, the CPU 102b outputs an error message indicating that overflow of the storage device occurred. In addition, if the number "fileCNT" of the right values when generating the rights-file exceeds the prescribed value, the CPU 102b outputs an error message indicating so.

The memory unit 102c is a unit for storing data and includes a plurality of folders. In addition, the memory unit 102c has the IC card identification ID previously stored.

Figure 6:
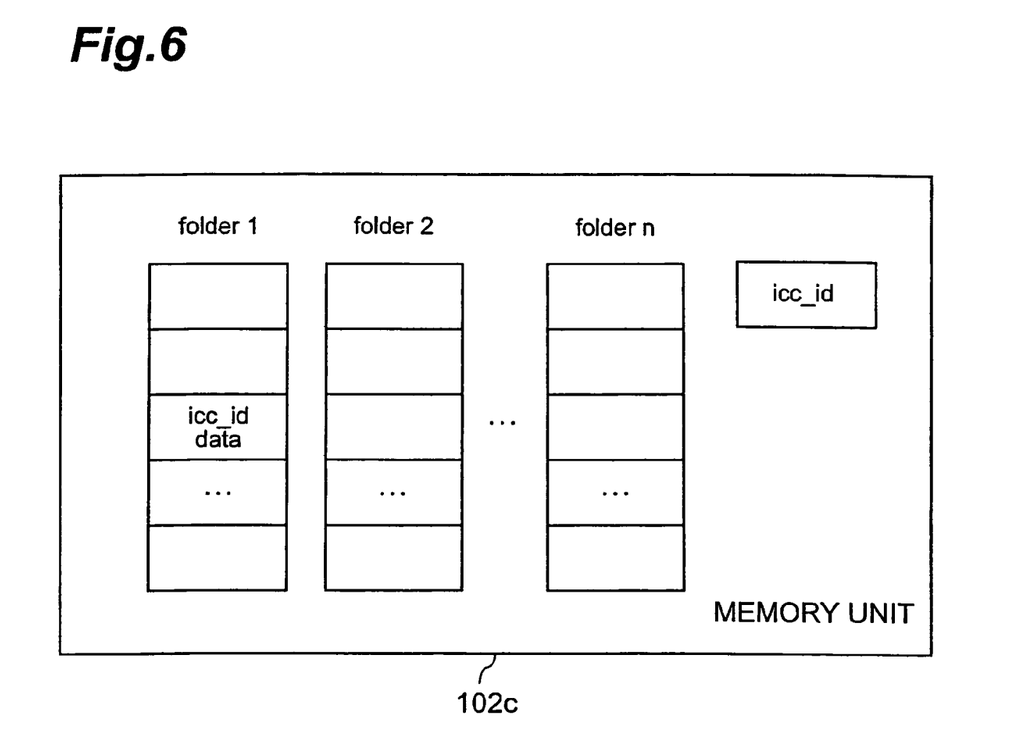
FIG. 6 is a conceptual diagram of a folder stored in the IC card 102.

Now, the constitution of a plurality of folders representing the storage area constituted in the memory unit 102c of the IC card 102 will be described. FIG. 6 is a conceptual diagram of folders stored in the IC card 102. As shown in FIG. 6, a plurality of folders is provided in the IC card 102. The folders are further segmented into a plurality of record regions, where individual record regions can store a single data (one file) respectively. Therefore, one record region can store one rights-file including the right value information "data" and the IC card identification ID "icc_id" of the IC card 102. In addition, the rights-file is associated with a file ID uniquely defined in the folder. By using the file ID, a rights-file can be specified in the folder. In addition, an IC card identification ID "icc_id" assigned to each IC card which can uniquely identify the IC card 102 is previously stored in a region in addition to the above-mentioned folder in the IC card 102.

Returning to FIG. 2, the CPU 103 is a control unit for controlling the entire portable terminal 100 including the application 101. In addition, the communication unit 104 is a unit for communicating with the other party via a network, and capable of transmitting the rights-file stored in the IC card 102 to the portable terminal 200.

Figure 7:
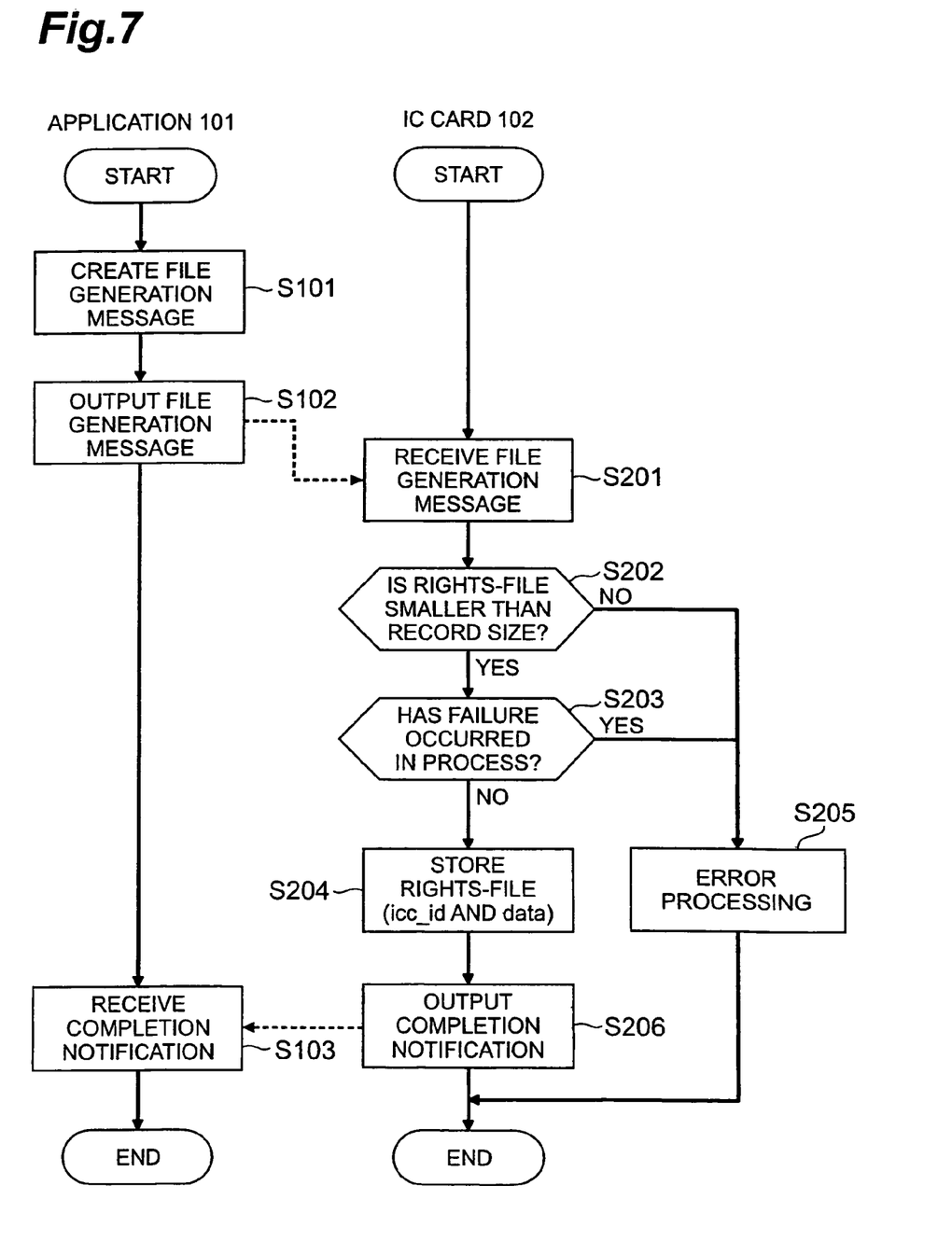
FIG. 7 is a flow chart illustrating the operation of an application 101 and the IC card 102.

Operation of the application 101 and the IC card 102 in the portable terminal 100 thus arranged will be described as follows. FIG. 7 is a flow chart showing the operation of the application 101 and the IC card 102.

In the application 101, instruction for generating the rights-file generation is given by user operation of the portable terminal 100 to create (S101) a file generation message (see FIG. 3). Then in the application 101, a file generation message is output with the IC card 102 as the destination (S102).

The IC card 102 receives the file generation message created in the application 101 (S201). Then, it is determined whether or not the size of the rights-file to be stored into the IC card 102 is larger than one record region formed in the folder of the IC card 102 (S202). Here, the size of the rights-file to be stored is calculated based on the right value information "data", the IC card identification ID of the IC card 102 described as the transmission destination, and the file ID.

If the size of the rights-file is determined to be smaller than one record region in the IC card 102, the CPU 102b determines whether or not failure occurred when generating the rights-file (S203). For example, the CPU 102b determines that failure occurred in cases such as: the numerical value indicated by the data size "LEN" of the right value information differs from the real size of the right value information "data"; the application identification ID of the application 101 which is the source of transmission is not stored as the owner in the IC card 102 and thus impossible to authenticate; a folder indicated as the storage destination folder "folder" does not exist in. the IC card 102; the number "fileCNT" of right values is zero; the numerical value indicated by the data size "fileLEN" of the right value exceeds the maximum storage file size value; there is no free space for newly generating a rights-file; the number "fileCNT" of right values when generating a rights-file exceeds the default value.

If the CPU 102b thus determined that a failure occurred, the CPU 102b executes an error processing to output an error message (S205) and the process terminates. For example, if the numerical value indicated by the data size "LEN" of the right value information differs from the real size of the right value information "data", an illegal error message indicating so will be output. If the application identification ID of the application 101 which is the source of transmission is not stored as the owner and thus cannot be normally authenticated, an access violation error message indicating so will be output. If a folder indicated as the storage destination folder "folder" does not exist in the IC card 102 an error message indicating so will be output. If the number "fileCNT" of right values is zero, an illegal error message indicating so will be output. If the numerical value indicated by the data size "fileLEN" of the right value exceeds the maximum storage file size value, and there is no free space for newly generating a rights-file an error message indicating that overflow of the storage device occurred will be output. If the number "fileCNT" of right values when generating a rights-file exceeds the prescribed value an error message indicating so will be output (S205).

If it is determined that no failure occurred in the IC card 102, the rights-file including the IC card identification ID of the IC card 102 and right value information is stored in one record region of a folder in accordance with the storage destination folder described in the right value information provided with a file ID (S204). Here, if a rights-file including the file data and identifying-ID of the IC card 102 according to the same right value information already exists in the storage destination folder when being stored into the one record region, an updating process of the rights-file will be executed by increasing the number of right values described in the right value information.

In addition, if it is determined that the size of the rights-file is not smaller than the one record area in the IC card 102, the procedure will be terminated without generating a rights-file, after an error processing is executed (S205). Here, the IC card 102 notifies the application 101 of the error occurrence.

After completion of the storage process (or after an updating process), the IC card 102 outputs a completion notification to the application 101 (S206). The application 101 receives the completion notification and recognizes that generation of the rights-file has been finished (S103).

As thus described, the IC card 102 of the portable terminal 100 stores the right value information and identifying-ID of the IC card 102 as a rights-file. Therefore, a user of the portable terminal 200 can use the rights-file as ticket information by downloading the rights-file from the portable terminal 100 into the IC card provided in the portable terminal 200 possessed by the user.

Here, when outputting the rights-file from the portable terminal 100 to the portable terminal 200 being a user, or performing an exchange transaction of electronic money stored in the portable terminal 200, it is necessary to output the IC card identification ID of the IC card 102 in an encrypted manner for preventing leakage of the IC card identification ID of the IC card 102 over a network. In this case, functionality for decoding and storing the encrypted IC card identification ID is required in the recipient portable terminal 200.

In addition, the portable terminal 100 can perform secure transaction of rights-files, using a predetermined communication protocol (e.g., Optimistic Fair Exchange Protocol of right values) which enables direct communication of right values between IC cards. By using such a protocol, tampering or the like by a third party can be prevented, whereby it is possible to guarantee uniqueness of the IC card identification ID provided to right value information. Japanese Patent Application Laid-Open No. 2001-143009 describes the optimistic fair exchange protocol of right values in detail.

An operation and effect of the IC card 102 which is a tamper resistant device of the present embodiment will be described next. The IC card 102 of the present embodiment receives, with the interface unit 102a, a file generation message including right value information representing a right value and numeral information instructing generation of the rights-file. Then, the CPU 102b determines whether or not the right value information representing a right value and the numeral information instructing generation of the rights-file are included in the received file generation message. If the CPU 102b determined that the file generation message received via the interface unit 102a includes the right value information and the numeral information, the CPU 102b generates a rights-file including the IC card identification ID and right value information so that the memory unit 102c can store the generated rights-file. In this manner, the CPU 102b can generate the rights-file including the IC card identification ID and right value information, whereby the generator and validity of the right value information can be guaranteed using the IC card identification ID included in the rights-file, without executing a signature process for the right value information.

For example, when the IC card 102 being a tamper resistant device outputs the rights-file including the right value information and IC card identification number to another portable terminal 200 provided with an IC card, verification of the right value information is realized at another portable terminal 200 which received the generated rights-file by receiving the information using an external card-reader. Then, the external card-reader can verify the validity of the right value information by simply inspecting collation between the right value information and the identifier, which can be executed much faster than when executing a signature process.

What is claimed is:

1. A tamper resistant device that is an IC card, which stores an identifier capable of uniquely identifying the tamper resistant device, comprising:

a receiving unit configured to receive a file generation message including right value information representing a right value and instruction information, which instructs generation of a rights-file including the right value information and the identifier;

a message determination unit configured to determine whether or not the file generation message received by the receiving unit includes the right value information representing the right value and the instruction information, which instructs generation of the rights-file including the right value information and the identifier;

a file generation unit configured to generate, if the message determination unit determines that the file generation message received by the receiving unit includes the right value information and the instruction information, the rights-file including the identifier and the right value information, wherein the identifier is an IC card identification ID stored in the IC card; and a storage unit configured to store the rights-file generated by the file generation unit, wherein the storage unit is configured to store the rights-file generated by the file generation unit in accordance with a storage destination folder described in the right value information included in the file generation message received by the receiving unit.

2. A tamper resistant device that is an IC card, which stores an identifier capable of uniquely identifying the tamper resistant device, comprising:

a receiving unit configured to receive a file generation message including right value information representing a right value and instruction information, which instructs generation of a rights-file including the right value information and the identifier;

a message determination unit configured to determine whether or not the file generation message received by the receiving unit includes the right value information representing the right value and the instruction information, which instructs generation of the rights-file including the right value information and the identifier;

a file generation unit configured to generate, if the message determination unit determines that the file generation message received by the receiving unit includes the right value information and the instruction information, the rights-file including the identifier and the right value information, wherein the identifier is an IC card identification ID stored in the IC card; and a storage unit configured to store the rights-file generated by the file generation unit, wherein the receiving unit is configured to receive the file generation message including an application identification ID indicating a transmission source of the file generation message, the IC card identification ID that is a transmission destination of the file generation message, the instruction information, the right value information, and length information indicating a data size of the right value information.

3. A tamper resistant device that is an IC card, which stores an identifier capable of uniquely identifying the tamper resistant device, comprising:

a receiving unit configured to receive a file generation message including right value information representing a right value and instruction information, which instructs generation of a rights-file including the right value information and the identifier;

a message determination unit configured to determine whether or not the file generation message received by the receiving unit includes the right value information representing the right value and the instruction information, which instructs generation of the rights-file including the right value information and the identifier;

a file generation unit configured to generate, if the message determination unit determines that the file generation message received by the receiving unit includes the right value information and the instruction information, the rights-file including the identifier and the right value information, wherein the identifier is an IC card identification ID stored in the IC card;

a storage unit configured to store the rights-file generated by the file generation unit; and an error detection unit configured to determine whether a failure occurred while generating the rights-file, wherein the error detection unit is configured to determine that the failure has occurred when a folder indicated as a storage destination folder does not exist in the tamper resistant device.

4. A file generation method of a tamper resistant device that is an IC card, which stores an identifier capable of uniquely identifying the tamper resistant device, comprising:

receiving, by the IC card, a file generation message including right value information representing a right value and instruction information, which instructs generation of a rights-file including the right value information and the identifier;

determining, by the IC card, whether or not the received file generation message includes the right value information representing the right value and the instruction information, which instructs generation of the rights-file including the right value information and the identifier;

generating, by the IC card, if the file generation message is determined to include the right value information and the instruction information, the rights-file including the identifier and the right value information, wherein the identifier is an IC card identification ID stored in the IC card; and storing, by the IC card, the generated rights-file, wherein the step of storing the generated rights-file comprises storing the generated rights-file in accordance with a storage destination folder described in the right value information included in the received file generation message.

5. A file generation method of a tamper resistant device that is an IC card, which stores an identifier capable of uniquely identifying the tamper resistant device, comprising:

receiving, by the IC card, a file generation message including right value information representing a right value and instruction information, which instructs generation of a rights-file including the right value information and the identifier;

determining, by the IC card, whether or not the received file generation message includes the right value information representing the right value and the instruction information, which instructs generation of the rights-file including the right value information and the identifier;

generating, by the IC card, if the file generation message is determined to include the right value information and the instruction information, the rights-file including the identifier and the right value information, wherein the identifier is an IC card identification ID stored in the IC card; and storing, by the IC card, the generated rights-file, wherein the step of receiving the file generation message comprises receiving the file generation message including an application identification ID indicating a transmission source of the file generation message, the IC card identification ID that is a transmission destination of the file generation message, the instruction information, the right value information, and length information indicating a data size of the right value information.

6. A file generation method of a tamper resistant device that is an IC card, which stores an identifier capable of uniquely identifying the tamper resistant device, comprising:

receiving, by the IC card, a file generation message including right value information representing a right value and instruction information, which instructs generation of a rights-file including the right value information and the identifier;

determining, by the IC card, whether or not the received file generation message includes the right value information representing the right value and the instruction information, which instructs generation of the rights-file including the right value information and the identifier;

generating, by the IC card, if the file generation message is determined to include the right value information and the instruction information, the rights-file including the identifier and the right value information, wherein the identifier is an IC card identification ID stored in the IC card;

storing, by the IC card, the generated rights-file; and determining whether a failure occurred while generating the rights-file, wherein the step of determining whether the failure occurred comprises determining that the failure occurred while generating the rights-file when a folder indicated as a storage destination folder does not exist in the tamper resistant device.

* * * * *